(No Model.)

J. DODGE.
HARNESS.

No. 302,473. Patented July 22, 1884.

WITNESSES
Sidney P. Hollingsworth
Wm. H. Shipley

INVENTOR
Josiah Dodge
By P. T. Dodge,
Attorney

UNITED STATES PATENT OFFICE.

JOSIAH DODGE, OF APPLETON CITY, MISSOURI.

HARNESS.

SPECIFICATION forming part of Letters Patent No. 302,473, dated July 22, 1884.

Application filed November 1, 1883. (No model.)

*To all whom it may concern:*

Be it known that I, JOSIAH DODGE, of Appleton City, St. Clair county, Missouri, have invented a new and Improved Harness, of which the following is a specification.

This invention relates to a harness designed more especially for use in connection with wheeled harrows and other agricultural machines requiring the draft or propelling-power to be applied thereto at two points, one above the other.

To this end it consists in a harness adapted for a horse or other draft-animal, provided with traces arranged in pairs, one pair on each side of the animal. In other words, it consists of a harness having on each side two traces or tugs, instead of a single trace, as usual. With the exception that they are provided with an additional trace, the draft devices on each side of my harness may be identical in construction with those now in common use. The traces on the same side of the harness may be connected at their forward ends, or both united to the harness at the point at which it is customary to attach the usual single traces, or they may be attached at different points near each other, the only essential requirement being that they shall be independent of each other at the rear ends, so that they may be attached to the machine or to draft devices thereon at different heights.

Figure 1:
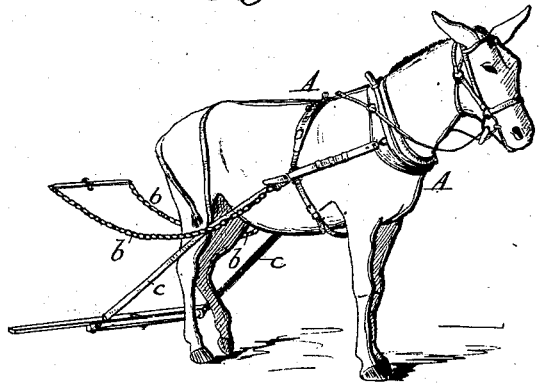
Figure 2:
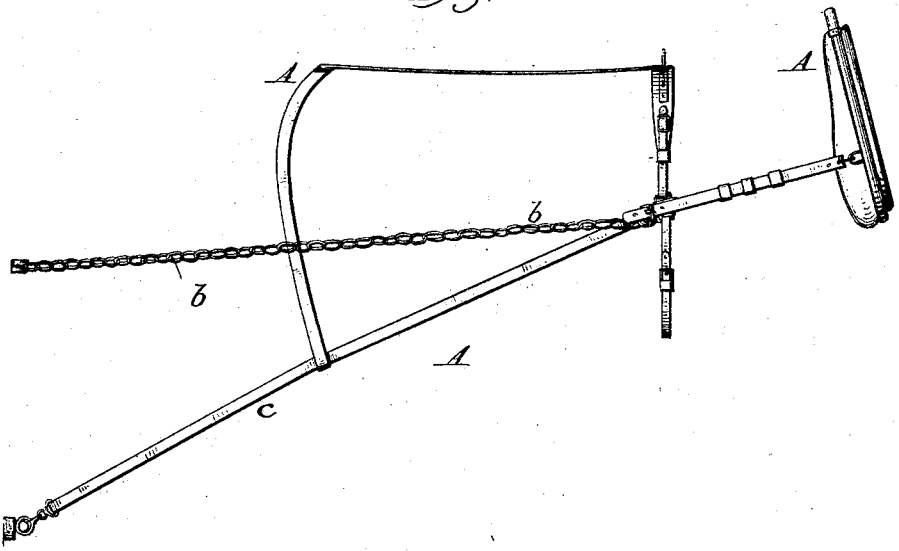

In the accompanying drawings, Figure 1 represents a perspective view of an animal provided with my improved harness. Fig. 2 is a side elevation illustrating the manner in which the harness is applied to transmit the draft to two points at different elevations.

A represents the body portion of the harness, which, as before stated, may be of ordinary construction; and $b$ $c$, the traces or tugs.

It will be observed that the harness is provided with four tugs—two on each side—and that the companion tugs $b$ $c$ are united to the harness at a common point. From the point of attachment the companion traces extend backward independently of each other, being made of the same or of different lengths, as circumstances may require, and adapted for separation at their rear ends, so that the upper traces, $b$, may be attached to a draft device at any desired distance above the device to which the lower trace, $c$, is attached. It will be readily perceived that by means of these double traces I am enabled to transmit power directly to devices or connections at different elevations independently of each other, and that each connection is permitted to rise and fall without affecting the application of power to the other.

Having thus described my invention, what I claim is—

1. A draft-harness for agricultural implements, &c., provided with two pairs of traces, arranged substantially as shown and described.

2. A harness for a draft-animal, provided on each side with two traces connected thereto at a common point, and extending rearward in divergent lines independent of each other.

JOSIAH DODGE.

Witnesses:
 E. WELLS,
 J. H. NICHOLS.